United States Patent [19]

Nagata et al.

[11] 3,969,300

[45] July 13, 1976

[54] WATER-SOLUBLE COATING MATERIALS

[75] Inventors: Nobuyoshi Nagata, Nara; Ryuzo Mizuguchi, Osaka, both of Japan

[73] Assignee: Nippon Paint Co., Ltd., Osaka, Japan

[22] Filed: Sept. 24, 1973

[21] Appl. No.: 399,884

Related U.S. Application Data

[63] Continuation-in-part of Ser. No. 182,563, Sept. 28, 1971, abandoned, which is a continuation-in-part of Ser. No. 732,556, May 28, 1968, abandoned.

[52] U.S. Cl.................. 260/29.4 UA; 260/33.2 EP; 260/33.4 EP; 260/834; 260/837 R; 260/851; 260/855; 260/856; 204/181; 427/386
[51] Int. Cl.$^2$......................................... C08L 61/20
[58] Field of Search............ 260/29.4 UA, 834, 851, 260/33.2 EP, 33.4 EP, 837 R, 855, 856; 204/181; 427/410, 386

[56] References Cited
UNITED STATES PATENTS

| | | | |
|---|---|---|---|
| 3,070,564 | 12/1962 | Roeser.............................. | 260/33.6 |
| 3,505,128 | 4/1970 | Fujii et al..................... | 260/29.4 UA |
| 3,516,913 | 6/1970 | Sekmakas et al.................. | 204/181 |

*Primary Examiner*—Lorenzo B. Hayes
*Attorney, Agent, or Firm*—Beveridge, DeGrandi, Kline & Lunsford

[57] ABSTRACT

A coating material having excellent adhesion to the surfaces of substrates including metals and excellent flexibility, durability, chemical-resistance and rust-preventive property which comprises water, a water-soluble organic solvent and a water-soluble, thermosetting resin as substantial film-forming component, said resin being obtained by (A) adding an amine to 100 parts by weight of a copolymer consisting of (1) 50 to 80.5 parts by weight of at least one polymerizable, unsaturated monomer free from hydroxyl group, (2) a total of 19.5 to 50 parts by weight of an $\alpha,\beta$-ethylenically unsaturated acid and an epoxy resin having at least two epoxy groups in the molecule, the proportion of said epoxy resin being 0.01 to 0.5 equivalent with respect to the carboxyl group contained in said $\alpha,\beta$-ethylenically unsaturated acid, said $\alpha,\beta$-ethylenically unsaturated acid having been reacted with 10 % or more of the epoxy groups of said epoxy resin, and (3) 0 to 30 parts by weight of at least one polymerizable, unsaturated monomer having a hydroxyl group in the molecule, the total amount of the (1), (2) and (3) components being 100 parts by weight, the amount of said amine being 0.5 to 2.0 equivalent with respect to the carboxyl group in the copolymer, thereby converting said copolymer into a water-soluble salt; and (B) adding, to said water-soluble salt, 4 to 50 parts by weight of a water-soluble amino resin.

39 Claims, No Drawings

WATER-SOLUBLE COATING MATERIALS

CROSS-REFERENCES TO RELATED APPLICATIONS

This is a continuation-in-part of our copending application Ser. No. 182,563 filed Sept. 28, 1971, which is a continuation-in-part of our copending application Ser. No. 732,556 filed May 28, 1968 and both now abandoned.

The present invention relates to heat-crosslinking type water-soluble coating materials which are obtained by converting copolymers composed of an $\alpha,\beta$-ethylenically unsaturated carboxylic acid, an epoxy resin having 2 or more epoxy groups in its molecule and a polymerizable unsaturated monomer into amine salts, thereby rendering the same water-soluble and combining the amine salts with water-soluble amino resins.

Processes for producing copolymers of acrylic acid or methacrylic acid and esters of either one of said acids, and for producing water-soluble salts from said copolymers, are well known.

The primary object of the present invention is to obtain excellent hardened coating films by preparing water-soluble amine salts of such copolymers as described above, not by merely mixing epoxy resins with the other components but by introducing said epoxy resins into said copolymers by addition reaction, and by making use of the condensation reaction between the hydroxyl group contained in the copolymers and water-soluble amino resins which takes place on heating. In this way, it is possible to easily impart, to coating materials consisting primarily of polymeric water-soluble resins, the excellent characteristics possessed by the epoxy resins, such as excellent flexibility, adhesive property, durability, rust-preventive property and chemical-resistant property.

That is, the present invention relates to coating materials characterized by containing water, a water-soluble organic solvent and a water-soluble, thermosetting resin as substantial, film-forming component, said resin being obtained by A. adding an amine capable of forming a watersoluble salt to 100 parts by weight of a copolymer consisting essentially of
1. 50 to 80.5 parts by weight of at least one polymerizable unsaturated monomer free from hydroxyl group,
2. a total of 19.5 to 50 parts by weight of an $\alpha,\beta$-ethylenically unsaturated acid and an epoxy resin having 2 or more epoxy groups in the molecule in a proportion of 0.01 to 0.5 equivalent of the epoxy resin with respect to the carboxyl group contained in said $\alpha,\beta$-ethylenically unsaturated acid, said $\alpha,\beta$-ethylenically unsaturated acid having been reacted with 10% or more of the epoxy groups of said epoxy resin, and
3. optionally 0 to 30 parts by weight of at least one polymerizable unsaturated monomer having a hydroxyl group in the molecule, the total amount of the water (1), (2) and (3) components being 100 parts by weight, the amount of said amine being 0.5 to 2.0 equivalents with respect to the carboxyl group in the copolymer, thereby converting said copolymer into a water-soluble salt, and B. adding to said water-soluble salt 4 to 50 parts by weight of a water-soluble amino resin.

The coating films obtained with the coating materials of the present invention having the above-mentioned resin composition, exhibit excellent adhesive property with the surfaces of substrates including metals, and excellent flexibility, durability, chemical-resistant property and rust-preventive property, owing to the epoxy resin component present in the copolymer. Further, since the crosslinking is effected through the amino resin, the coating films formed of the present coating materials have excellent thermal stability, solvent-resistant property, water-proof property and salt-water-resistant property.

Polymerizable, unsaturated monomers to be used for A(1) are preferably those having 2 to 30 carbon atoms and include, for example, acrylates and methacrylates of alkanols, said alkanols having 1 to 16 carbon atoms; ethylene; styrene; vinyltoluene; vinyl esters, such as vinyl acetate, vinyl propionate, vinyl butyrate and vinyl caproate; styrene derivatives, such as $\alpha$-methylstyrene, m-ethylstyrene and p-ethylstyrene; diesters of unsaturated dicarboxylic acids having 4 to 5 carbon atoms, such as maleic acid and fumaric acid, with alkanols having 1 to 4 carbon atoms; acrylonitrile; methacrylonitrile; and vinyl esters of neo-acids, said neo-acids having 5 to 27 carbon atoms, which vinyl esters have the formula,

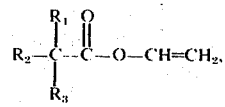

wherein $R_1$, $R_2$ and $R_3$ are straight chained alkyl groups having in total 3 to 25 carbon atoms (for example, "Veova" 10 of Shell Chemical Company). In the actual practice of the present invention, these monomers are frequently used in combination in consideration of the properties of the desired coating material. For example, mixtures of styrene and at least one monomer selected from acrylates and methacrylates of alkanols, said alkanols having 1 to 16 carbon atoms, are preferred.

$\alpha,\beta$-Ethylenically unsaturated carboxylic acids usable for A(2) include $\alpha,\beta$-ethylenically unsaturated mono- and di-carboxylic acids, preferably having 3 to 5 carbon atoms, for example, acrylic acid, methacrylic acid, crotonic acid, itaconic acid, maleic acid and fumaric acid; and monoesters of these acids with alkanols, said alkanols having 1 to 4 carbon atoms. These acids may be used in admixture of two or more. Others will be obvious to those skilled in the art.

As examples of epoxy resins having two or more epoxy groups in their molecules to be used for A(2), reference is made to those epoxy resins which are most widely used at pesent and which are polyglycidyl polyethers of dihydric phenols, such as p,p'-dihydroxy diphenyl-2,2'-propane (bisphenol A), 4,4'-dihydroxybenzophenone, bis(4-hydroxyphenyl)methane, 1,1'-bis(4-hydroxyphenyl)ethane, 1,1'-bis(4-hydroxyphenyl)isobutane, 2,2'-bis(3-hydroxyphenyl)butane, 2,2'-bis(4-hydroxy-2-methylphenyl)propane, 2,2'-bis(2-hydroxynaphthyl)pentane, 1,5-dihydroxynaphthalene, etc., or polyhydric alcohols, such as glycerin or pentaerythritol, said polyethers being, in general, prepared by heating at about 30° to 200°C one or a mixture of dihydric phenols with epichlorohydrin, dichlorohydrin or a mixture thereof in a basic reaction medium. Particularly preferred polyglycidyl ethers of bisphenol A are those having a molecular weight in the range of from about 360 to 1200. As a liquid polyepoxide resin which is the reaction product of bisphenol A and epichlorohydrin having a molecular weight of 390 and an epoxy value of 0.54, Epon 828 is commercially available. By reducing the mole ratio of epichlorohydrin to bisphenol A to a value of less than 2.1, still higher molecular weight products may be achieved. A polyepoxide having a molecular weight of 630 and an epoxy value of 0.26 and produced by reaction of bisphenol A and epichlorohydrin may also be used. A commercially available material of this type is Epon 864. Epon 1001 having a molecular weight of about 1000 and an epoxy value of 0.20 may also be used. Other commercially available epoxy resins which may be employed are Araldite 6010, 6020, 6030, 6040, and 6060 and DER 330, 332, 334, 335, 336, 660, 661, 662, 664, 668, and 726.

When one carboxyl group of $\alpha$, $\beta$-ethylenically unsaturated carboxylic acid and one epoxy group of epoxy resin are reacted with each other, one hydroxyl group is produced concurrently with the formation of ester bond.

For example, an addition reaction, such as

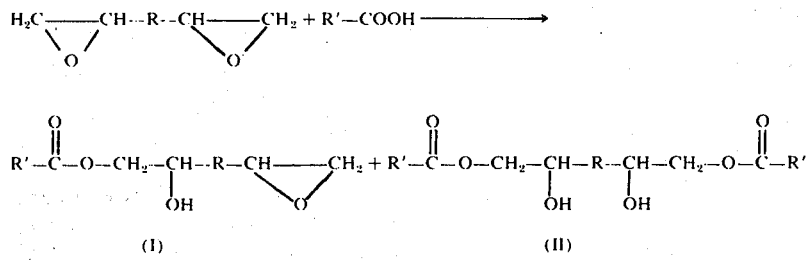

R: For example,

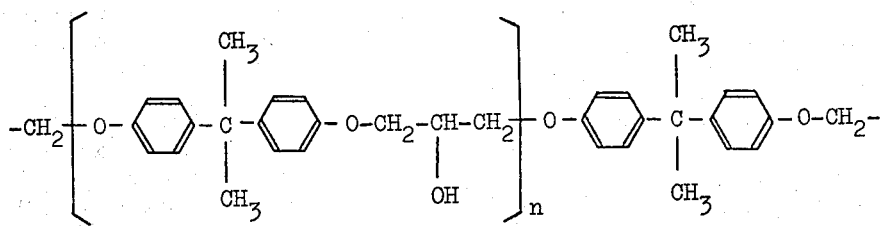

wherein
$n$ is an integer of 0 to 20, preferably 1 to 10, and
R': An $\alpha$, $\beta$-ethylenically unsaturated carboxylic acid residue, takes place easily at a temperature of, 100° to 160°C, preferably 140° to 160°C, and, since the R' group has polymerizability the epoxy resin component having a hydroxyl group is introduced into the copolymer by the copolymerization reaction. Some of the epoxy resins have a hydroxyl group as functional group, in addition to epoxy group, and by the use of such resins, the amount of hydroxyl group in the copolymer is further increased. According to the present invention, hardened coating films are obtained by causing a condensation reaction, during baking, between the hydroxyl groups contained mainly in these copolymers and amino resins, but if necessary, the monomers shown in A(3) above can optionally be used to introduce hydroxyl groups into the copolymers. Examples of the monomers having a hydroxyl group, which are used as auxiliary component as described above, are hydroxyalkyl methacrylates, such as 2-hydroxyethyl methacrylate, hydroxypropyl methacrylate and hydroxybutyl methacrylate; hydroxyalkyl acrylates, such as 2-hydroxyethyl acrylate, hydroxypropyl acrylate and hydroxybutyl acrylate; allyl alcohol; methallyl alcohol; N-methylol acrylamide and N-methylol methacrylamide. Others will be obvious to those skilled in the art. Preferably, those monomers have 3 to 8 carbon atoms.

In the foregoing description, it is stated that the epoxy resin component is introduced into the copolymers by conducting an addition reaction between the epoxy resns and the $\alpha$, $\beta$-ethylenically unsaturated carboxylic acids before the copolymerization reaction. According to the present invention, however, it is also possible to introduce the epoxy resin component into the copolymers by first copolymerizing the $\alpha$, $\beta$-ethylenically unsaturated carboxylic acids with the others monomers to form copolymers and then conducting an addition reaction between the carboxyl group contained in the copolymers and the epoxy resins, or to introduce the epoxy resin component into the copolymers by effecting the copolymerization reaction and the addition reaction concurrently. In either case, the effect intended by the present invention cannot be obtained unless at least 10% of the epoxy group participates in the addition reaction. However, it should be noted that when all the epoxy groups are used for addition reaction with the carboxyl groups of the $\alpha$, $\beta$-ethylenically unsaturated caboxylic acid and the mixture is used in a large amount, copolymers useful for coating materials may not be obtained, because the copolymers frequently have a three-dimensional structure and the structure goes beyond the gel point. In such a case, it is preferable to limit the degree of addition reaction of epoxy group to a suitable point between 10 and 100%. If this is the case, a certain amount of unreacted epoxy resin inevitably remains in the system. However, such an unreacted epoxy resin does not adversely affect the meritorious features of the present invention if the amount thereof is relatively small, and even when the amount is considerably large, it is possible to obtain a homogeneous water-soluble copolymers by conducting a modification as required in the following manner. For example, the unreacted epoxy resin may be subjected to addition reaction with polybasic acids, such as adipic acid, maleic acid and trimellitic acid, which are normally used as materials for alkyd resins, thereby converting the epoxy resin into a watersoluble derivative having a hydroxyl group. Or an amine, such as ethanolamine or diethanolamine, is used in neutralizing the copolymers into water-soluble salts, so that the unreacted epoxy resin may be reacted with the ethanolamine or diethanolamine simultaneously and converted into water-soluble derivatives having many amino groups and hydroxyl groups which are water-affinitive groups. In either case, the aforesaid modified derivatives are crosslinked simultaneously with copolymers when amino resins are added to form a hardened coating film.

The total amount of the α, β-ethylenically unsaturated acid and epoxy resin is from 19.5 to 50 parts by weight. With an amount smaller than that specified, the effect of the epoxy resin component cannot be obtained, the water-solubility of the copolymers is insufficient, and the coating film obtained from the copolymer is not satisfactory in hardness, adhesive property, warm water-resistance, and salt water-resistance. On the other hand, with an amount of more than 50 parts by weight, it is extremely difficult technically to obtain the copolymers, and the coating film obtained from the copolymer is not satisfactory in impact resistance, warm water-resistance and durability.

The copolymers of this invention can be prepared by a method known per se, e.g. by mass polymerization, emulsion polymerization or solution polymerization. The polymerization reaction is preferably carried out in a mixed solvent consisting of water and an alkanol, such as methanol, ethanol or butanol, or a glycol derivative, such as ethylene glycol monomethyl ether or ethylene glycol monoethyl ether, in an amount larger than the amount of water, at a temperature of 40° to 160°C. in the presence of azo compounds, peroxides or other polymerization initiators.

To the copolymers obtained are then added 0.5 to 2.0 equivalents of amines with respect to the carboxyl group contained in said copolymers, thereby rendering the copolymers water-soluble. The amines used in the present invention may be any of those which are conventionally added to resins having carboxyl groups to solubilize the same in water, e.g., ammonia; mono-, di- or tri-alkylamines, such as methylamine, dimethylamine, trimethylamine, ethylamine, diethylamine or triethylamine; mono- or di-alkanolamines, such as ethanolamine, or diethanolamine; aromatic amines, such as aniline, monomethylaniline, dimethylaniline, diethylaniline, toluidine, N-mono-n-butylaniline, o-chloroaniline, etc.; and heterocyclic amines, such as morpholine or piperidine. The amines which may be used in the present invention have a boiling point of up to 268°C, preferably 60° to 160°C. Other amines will be obvious to those skilled in the art. For rendering the copolymers water-soluble, the amines may be used in an amount of less than 0.5 equivalent or more than 2.0 equivalents of the carboxyl group contained in said copolymers, but the use of the amines in such amounts will not bring about any advantages.

The term "amino resin" used herein has the meaning defined in The Condensed Chemical Dictionary, seventh edition (Reinhold Publishing Corporation, New York). That is, the amino resin refers to a large class of thermosetting resins made by the reaction of an amine with an aldehyde. As said aldehyde, there may be used formaldehyde, acetaldehyde, paraldehyde, butyraldehyde, acrolein, crotonaldehyde, benzaldehyde, furfural, etc. As said amine, there may be used, preferably, urea, melamine, benzoguanamine and dicyandiamide,
or derivatives of these compounds. Amino resins having a not excessively high condensation degree are preferably used. Amino resins having methylol groups partially or entirely etherified with alcohols, such as hexamethoxymethylmelamine, dimethoxymethylurea, etc., are excellent in miscibility with the copolymers of the present invention and in storage stability after mixing. The amount in which the amino resins are used is preferably from 4 to 50 parts by weight per 100 parts by weight of the water-soluble salts of copolymers. An amount smaller than specified above will result in insufficient solvent-resistant property of the coating films formed, whereas an amount larger than specified above will result generally in brittleness of the coating films and an increase of unbalance of physical properties.

The coating materials according to the present invention may be applied by spray coating, brush coating, dip coating, roller coating, or electrodeposition coating. To the coating materials may be added conventional amounts of pigments and additives, which are commonly used with water-soluble paints. The pigments are preferably used in an amount of up to about 300 parts by weight per 100 parts by weight of the resin solids, though the amount is largely variable depending upon the kind of pigments. Water and organic solvents soluble in water, which are added during the synthesis of the copolymers and application of the present coating materials, are preferably used in such an amount that the weight ratio of the water and the organic solvents to the resin solids is from about 95 : 5 to about 30 : 70. In the present invention, it is preferable to use the water-soluble organic solvents in a considerably large amount for the synthesis of the copolymers, but it is sufficient to use water alone for the purpose of diluting the coating materials to a suitable viscosity for application. The water-soluble organic solvents used in the synthesis of the copolymers and application of the present coating materials are those which can be dissolved at least 2 % by weight in water at 20°C, and include, e.g. alkanols, such as methanol, ethanol and propyl alcohol; glycol derivatives, such as ethylene glycol monomethyl ether, ethylene glycol monoethyl ether, ethylene glycol monobutyl ether, diethylene glycol monomethyl ether, diethylene glycol monoethyl ether and diethylene glycol monobutyl ether; cyclic ethers, such as dioxane; and ketones, such as acetone and diacetone alcohol.

By baking and drying the coating films obtained by applying the coating materials of the present invention at 90° to 200°C. for 1 to 50 minutes, preferably at 120° to 160°C. for 20 to 40 minutes, excellent coating films can be obtained. During the baking and drying of the coating films, condensation reaction between the carboxyl group in the copolymers and the amino resins, or addition reaction between the carboxyl group and the epoxy group in the copolymers may occasionally take place, in addition to the condensation reaction between the hydroxyl group in the copolymers and the amino resins, which constitutes the essential feature of the present invention. However, these reactions do not adversely affect in any manner the properties of the coating films obtained with the coating materials of the instant invention.

The coating material of the present invention may further contain known water-soluble resins, such as water-soluble alkyd resins and water-soluble, modified phenol resins, as far as these do not impair the characteristics of the present invention, in an amount of about 50 parts by weight as solids per 100 parts by weight of the resin solids of the coating material of the present invention.

Materials which can be coated with the coating material of the present invention, consist mainly of metals represented by iron and its alloy and aluminum and alloys thereof, but are not necessarily restricted only thereto.

Now, the present invention will be illustrated specifically referring to the following Examples wherein all parts and percents are by weight unless otherwise specified.

EXAMPLE 1

1-a)

| | |
|---|---|
| Epikote 1001, an epoxy resin which is a condensation reaction product of bisphenol A and epichlorohydrin | 360.00 parts |
| Methacrylic acid | 137.60 parts |
| Ethylene glycol monoethyl ether | 124.40 parts |
| Hydroquinone | 0.07 part | were charged into a reactor. The ethylene glycol monoethyl ether was added for the purpose of preventing the temperature of the reaction system from rising unnecessarily high due to sudden occurrence of the reaction and also imparting to the reaction product a suitable fluidity, while the hydroquinone was added in order to inhibit the polymerization reaction at this stage. The reaction was carried out with stirring at a temperature of 140° to 150°C. The addition reaction between the epoxy group of Epikote 1001 and the carboxyl group of methacrylic acid was traced by measuring the decreasing amount of the carboxylic group in the system. Twenty percent of methacrylic acid participated in the addition reaction in about 3 hours. In this case, about 54 mol % of Epikote 1001 has been converted into addition derivative.

1-b)

| | |
|---|---|
| Solution of the addition reaction product obtained in 1-a) | 37.5 parts |
| Methacrylic acid | 45.0 parts |
| Methyl methacrylate | 60.0 parts |
| n-Butyl acrylate | 165.0 parts |
| Ethylene glycol monoethyl ether | 160.0 parts |
| Dioxane | 52.5 parts |
| Lauryl mercaptan | 6.0 parts | were charged into a reactor. Lauryl mercaptan as a chain transfer agent was added for the purpose of adjusting the product copolymer solution to a viscosity suitable for the intended coating material. The reaction mixture was heated with stirring to bring it into a refluxing condition, and while maintaining this condition, a polymerization initiator solution consisting of

| | |
|---|---|
| Azobisisobutyronitrile | 3.0 parts |
| Ethanol | 60.0 parts | was dropped over a period of 2 hours to effect the polymerization reaction. Upon completion of the dropping, the reaction mixture was further refluxed with heat for 2 hours while stirring. Then, the temperature was lowered to 60°C., and

| | |
|---|---|
| 30 % aqueous trimethylamine solution | 110.0 parts | was dropped over a period of 10 minutes to obtain a water-soluble resin solution containing 50% of non-volatile component and having a viscosity of $Z_2$ as measured by the Gardner Holdt-viscometer.

Comparative EXAMPLES 1 and 2

The same procedure as in Example 1 was repeated, except that the monomers shown in Table 1 were used as the constituents of the copolymers in the proportions shown in Table 1. The monomers used in Example 1 and the proportions thereof are also shown for comparison in Table 1.

Table 1

| Example No. | A(2) component | | A(1) component | | Total (based on non-volatile matter (part by weight) |
|---|---|---|---|---|---|
| | Solution of addition reaction product in Example 1-a) (part by weight) | Methacrylic acid (part by weight) | Methyl methacrylate (part by weight) | n-Butyl acrylate (part by weight) | |
| Comparative Example 1 | 22.5 (18.0) | 27.0 | 68.0 | 187.0 | 300.0 |
| Example 1 | 37.5 (30.0) | 45.0 | 60.0 | 165.0 | 300.0 |
| Comparative Example 2 | 90.0 (72.0) | 108.0 | 32.0 | 88.0 | 300.0 |

Note: The figures in parentheses are the amounts of non-volatile matter.

EXAMPLE 2

2-a)

| | |
|---|---|
| Epikote 1004, an epoxy resin which is a condensation reaction product of disphenol A and epichlorohydrin | 132.00 parts |
| Methacrylic acid | 43.00 parts |
| Ethylene glycol monobutyl ether | 175.00 parts |
| Hydroquinone | 0.02 part | were charged into a reactor and the reaction was carried out at a temperature of 150° to 160°C. Fifteen percent of methacrylic acid was subjected to addition reaction in about 4 hours. In this case, about 60 mol % of Epikote 1004 had been converted into addition derivative.

2-b)

| | |
|---|---|
| Solution of the addition reaction product obtained in 2-a) | 48.0 parts |
| Methacrylic acid | 36.0 parts |
| 2-Hydroxyethyl methacrylate | 15.0 parts |
| Methyl methacrylate | 97.5 parts |
| Ethyl acrylate | 135.0 parts |
| Ethylene glycol monoethyl ether | 120.0 parts |
| n-Butanol | 30.0 parts |
| Lauryl mercaptan | 6.0 parts | were charged into a reactor, and a polymerization initiator consisting of

| | |
|---|---|
| Azobisisobutyronitrile | 3.0 parts |
| Dioxane | 90.0 parts | was added in the same manner as in Example (1-b) to carry out the polymerization reaction. By adding to the reaction mixture

| | |
|---|---|
| 28% aqueous ammonia solution | 35.0 parts | a water-soluble solution was obtained which contained 50% of non-volatile component and had a viscosity of W as measured by the Gardner-Holdt viscometer.

Comparative EXAMPLES 3 and 4

The same procedure as in Example 2 was repeated, except that the monomers shown in Table 2 were used as the constituents of the copolymers in the proportions shown in Table 2. The monomers used in Example 2 and the proportions thereof are also shown for comparison in Table 2.

Table 2

| Example No. | A(2) component Solution of addition re-action product in Example 2-a) (part by weight) | Meth-acrylic acid (part by weight) | A(1) component Methyl meth-acry-late (part by weight) | Ethyl acrylate (part by weight) | A(3) component 2-Hydroxy-ethyl methacry-late (part by weight) | Total (based on non-volatile matter (part by weight) |
|---|---|---|---|---|---|---|
| Comparative Example 3 | 36.0 (18.0) | 27.0 | 103.5 | 144.0 | 15.0 | 307.5 |
| Example 2 | 48.0 (24.0) | 36.0 | 97.5 | 135.0 | 15.0 | 307.5 |
| Comparative Example 4 | 132.0 (66.0) | 99.0 | 56.0 | 71.0 | 15.0 | 307.5 |

Note:
The figures in parentheses are the amounts of non-volatile matter.

EXAMPLE 3

3-a)

| | |
|---|---|
| Epikote 828, an epoxy resin which is a condensation reaction product of disphenol A and epichlorohydrin | 525.00 parts |
| Methacrylic acid | 65.00 parts |
| Adipic acid | 164.00 parts |
| N,N'-diethylaminoethyl methacrylate | 14.00 parts |
| Ethylene glycol monoethyl ether | 192.00 parts |
| Hydroquinone | 0.02 part | were changed into a reactor. N,N'-diethylaminoethyl methacrylate is a catalyst for addition reaction between the carboxyl group and the epoxy group, and may not necessarily be used. The addition reaction was completed in about 15 minutes when the reaction was carried out at 150°C. with stirring.

3-b)

| | |
|---|---|
| Solution of the addition reaction product obtained in 3-a) | 56.3 parts |
| Methacrylic acid | 45.0 parts |
| n-Butyl acrylate | 120.0 parts |
| Styrene | 90.0 parts |
| Ethylene glycol monoethyl ether | 168.6 parts |
| Lauryl mercaptan | 6.0 parts | were changed into a reactor, and a polymerization initiator consisting of

| | |
|---|---|
| Azobisisobutyronitrile | 4.5 parts |
| Dioxane | 75.0 parts | was added in the same manner as in Example (1-b) to carry out the polymerization reaction. By further adding

| | |
|---|---|
| 28% aqueous ammonia solution | 70.0 parts | a water-soluble resin solution containing 48% non-volatile component and having a viscosity of U as measured by the Gardner-Holdt viscometer was obtained.

EXAMPLE 4

| | |
|---|---|
| Methacrylic acid | 50.0 parts |
| Methyl methacrylate | 50.0 parts |
| Lauryl methacrylate | 75.0 parts |
| n-Butyl methacrylate | 50.0 parts |
| 2-Hydroxyethyl methacrylate | 25.0 parts |
| Ethylene glycol monoethyl ether | 175.0 parts |
| Lauryl mercaptan | 5.0 parts | were charged into a reactor and heated with stirring to bring it into a refluxing condition. A polymerization initiator consisting of

| | |
|---|---|
| Azobisisobutyronitrile | 2.5 parts |
| Ethylene glycol monoethyl ether | 75.0 parts | was dropped over a period of 2 hours to effect the polymerization reaction. Upon completion of the dropping,

| | |
|---|---|
| Epikote 1001 | 75.0 parts |
| Ethylene glycol monoethyl ether | 50.0 parts | were added while maintaining the system at a temperature in the neighbourhood of about 140°C., to effect the addition reaction between the carboxyl group in the copolymer and the epoxy group in the Epikote 1001. After carrying out the reaction for 3 hours at a temperature in the neighbourhood of 140°C., about 5 % of the carboxyl group participated in the addition reaction. In this case, about 30 mol % of Epikote 1001 was reacted.

Then, the temperature was lowered to 100°C. and

| | |
|---|---|
| Ethanolamine | 58.0 parts | was added in a time as short as possible. The system was further stirred for 1 hour at 100°C. to obtain a water-soluble resin solution, which contained 52% of non-volatile component and had a viscosity of $Z_4$ as measured by the Gardner-Holdt viscometer.

EXAMPLE 5

Coating materials were prepared using the water-soluble resin solutions obtained in the respective Examples and Comparative Examples described hereinabove and coating films were formed of said individual coating materials. The properties of the coating films will be described hereunder. Although the coating materials consisting of the copolymers of the present invention may, of course, be used for the preparation of transparent paints and top coating paints, an example wherein the coating materials were used for the preparation of a primer and the properties of the resultant primer film will be briefly described herein. In this Example, hexamethoxymethylmelamine (Nikalac MW-30 produced by Nippon Carbide Industrial Company) was used as the water-soluble amino resin. First of all, a paste was prepared by use of

| | |
|---|---|
| Resin solution obtained in the respective Examples and Comparative Examples | 200.0 parts |
| Nikalac MW-30 | 20.0 parts |
| Basic lead chromate | 50.0 parts |
| Calcium carbonate | 40.0 parts |
| Rutile-type titanium dioxide | 20.0 parts |
| Red iron oxide | 40.0 parts | and diluted with water until the viscosity reached about 81 to 82 KU as measured by Stormer's viscometer, and thereafter dispersed in an ordinary ball mill for 24 to 48 hours. The properties of coating films formed of the thus obtained coating materials are summarized in Table 3. The coating film tested was formed by spraying the present coating material on a 0.8 mm. thick steel panel and heating it at 140°C. for 30 minutes. The coating material was sprayed so that the thickness of the dried coating film became 20 $\mu$. The hardness of the coating film was measured in terms of pencil hardness and the hardness values show the hardnesses of the highest grade, free of scratch, according to the usual method. The impact test was conducted by means of Du Pont's impact tester using a 500 gram weight on a ½ inch-diameter block. The Erichsen values were obtained using Erichsen tester according to the usual method. The adhesive property test was made by cutting the film with a needle to form 100 square pieces of 1 mm. in width, attaching an adhesive tape thereon and quickly detaching the adhesive tape. The film which had no square pieces detached therefrom as a result of the test was made "passed". The warm water-resistance test was tested by dipping the film in a city water at 40°C. for 240 hours. The salt water-resistance test was tested by dipping the film in a 3% common salt water at room temperature for 96 hours.

Table 3

| Example No. | Comp. Example 1 | Example 1 | Comp. Example 2 | Comp. Example 3 | Example 2 | Comp. Example 4 | Example 3 | Example 4 |
|---|---|---|---|---|---|---|---|---|
| Pencil hardness | B | 3H | 2H | H | 3H | 2H | 2H | 2H |
| Impact test (cm) | 30 | 40 | 20 | 30 | 40 | 20 | 50 | 40 |
| Erichsen value (mm) | 2.0 | 2.0 | 0.8 | 1.5 | 3.5 | 1.0 | 4.0 | 3.0 |
| Adhesive property test | Not passed | Passed | Passed | Not passed | Passed | Passed | Passed | Passed |
| Warm water-resistance test | Softened | No change | Blistered | Softened | No change | Blistered | No change | No change |
| Salt water-resistance test | Blistered | No change | No change | Blistered | No change | No change | No change | No change |

Reference EXAMPLE

The same components as in Example 1 were simply mixed. The resulting composition was difficult to dilute with water (a layer containing a large amount of epoxy compound became separated).

The coating film obtained therefrom was baked at 140°C for 30 min. The resulting cured film had not sufficient performance or properties. Another coating film obtained from the same composition as above was baked at 180°C for 30 min., the properties of the resulting cured film were still considerably inferior to those of the composition of Example (1-b). The results obtained were as shown in Table 4.

Table 4

| Baking condition | Example 1-b) | Reference Example | |
|---|---|---|---|
| | 140°C, 30 min. | 140°C, 30 min. | 180°C, 30 min. |
| Pencil hardness | 3H | 2B | H |
| Impact strength (cm) | 40 | 30 | 20 |
| Erichsen value (mm) | 2.0 | 2.0 | 0.5 |
| Adhesive property test | Passed | Passed | Failed |
| Warm water-resistance test | No change | Film dissolved | Film swollen and softened |
| Salt solution- | | | |

Table 4-continued

| Baking condition | Example 1-b) | Reference Example | |
|---|---|---|---|
| | 140°C, 30 min. | 140°C, 30 min. | 180°C, 30 min. |
| resistance test | No change | Rusted | Blistered |

The test method and the evaluation method were the same as in Example 5.

EXAMPLE 6

Ethylene glycol monobutyl ether (30.0 parts by weight) was charged into a reactor and maintained with stirring at 130°C, into which a solution of 2.0 parts by weight of azobisisobutyronitrile in a mixture of 43.8 parts by weight of the addition reaction product solution obtained in Example (3-a), 15.0 parts by weight of methacrylic acid, 15.0 parts by weight of styrene, 5.0 parts by weight of 2-hydroxyethyl methacrylate and 30.0 parts by weight of n-butyl acrylate was dropped in 2 hours while maintaining the reactor at 130°C. After the completion of addition of the solution, a solution of 0.2 part by weight of azobisisobutylonitrile in 11.2 parts by weight of ethyleneglycol monobutyl ether was dropped thereinto in 30 minutes.

The thus obtained resin solution (150.0 parts by weight) was mixed with 20.0 parts by weight of triethylamine, 40.0 parts by weight of "Cymel 300" (a trademark of American Cyanamid Co. for hexamethoxymethylmelamine), 100.0 parts by weight of water and 50.0 parts by weight of rutile type titanium oxide "R-820" to form a paint. This paint was suitably diluted with water and then subjected to electrodeposition coating. The resulting film was baked at 140°C. for 30 minutes to obtain a cured film having the following properties:

| | |
|---|---|
| Thickness of film: | 22 microns |
| Pencile hardness: | H |
| Impact test: | 50 cm. |
| Erichsen value: | 5.0 mm. |
| Adhesive property test: | Passed. |
| Warm water-resistance test: | No change |
| Salt water-resistance test: | No change |

EXAMPLE 7

| | | |
|---|---|---|
| i) | DER-732 (a trademark of The Dow Chemical Co. for a polyglycol diepoxide; epoxide equivalent weight, 305-335; viscosity at 25°C, 55-100 cps; specific gravity at 25/25°C, 1.06; flash point, 205°C) | 320 parts |
| | Methacrylic acid | 172 parts |
| | Ethyleneglycol monomethyl ether | 492 parts |
| | Hydroquinone | 0.1 part |

These materials were charged in a reactor and subjected to reaction at 120° – 130°C for 3 hrs.

| | | |
|---|---|---|
| ii) | The addition reaction product obtained in above i) | 80 parts |
| | Methacrylic acid | 30 parts |
| | Styrene | 50 parts |
| | n-Butyl acrylate | 180 parts |
| | Methyl ethyl ketone | 160 parts |
| | Lauryl mercaptan | 6 parts |

These materials were charged into a reactor, into which a solution of 3 part of azobisisobutyronitrile in 100 parts of ethyl alcohol was then dropped in 2 hrs. under reflux conditions. To the resulting mixture was added 55 parts of aniline and then 150 parts of water was added thereto to obtain a resin solution.

| | | |
|---|---|---|
| iii) | Urea | 30 parts |
| | Melamine | 126 parts |
| | 37% aqueous formaldehyde solution | 486 parts |

These materials were mixed and the pH of the resulting mixture was adjusted to 8.5 with triethylamine, after which the mixture was subjected to reaction at 80°C. When the polycondensation rate reached 15%, the reaction was stopped to obtain a water-soluble methylolated unreamelamine resin solution containing 48% of non-volatile matter.

| | | |
|---|---|---|
| iv) | The resin solution obtained in above ii) | 250 parts |
| | The amino resin solution obtained in above iii) | 30 parts |
| | Rutile type titanium dioxide | 50 parts |
| | Water | 50 parts |

These materials were mixed to obtain a water-soluble paint. This paint was diluted with a suitable amount of water, and the thus diluted paint was applied to an iron plate having a thickness of 0.8 mm and then baked at 160°C for 20 min. The thus obtained cured film had the following characteristics:

| | |
|---|---|
| Thickness of film: | 30 microns |
| Pencil hardness: | H |
| Erichsen value: | 5.8 mm |
| Adhesive property test: | Passed |
| Warm water-resistance test: | No change |
| Salt water-resistance test: | No change |

What is claimed is:

1. In a coating material comprising water, a water-soluble, organic solvent and a water-soluble, thermosetting resin as substantial, film-forming component, said resin being a mixture of (A) 4 to 50 parts by weight of a water-soluble amino resin and (B) a water-soluble salt of 100 parts by weight of a copolymer with 0.5 to 2.0 equivalents of an amine with respect to carboxyl groups in said copolymer, the improvement wherein said copolymer comprises:
   1. 50 to 80.5 parts by weight of at least one hydroxy-free, polymerizable, unsaturated monomer having 2 to 30 carbon atoms, and
   2. a total of 19.5 to 50 parts by weight of an $\alpha,\beta$-ethylenically unsaturated carboxylic acid having 3 to 5 carbon atoms and a polyglycidyl polyether of a dihydric phenol, said polyglycidyl polyether having at least two epoxy group, the proportion of said polyglycidyl polyether being 0.01 to 0.5 equivalent with respect to the carboxyl group contained in said $\alpha,\beta$-ethylenically unsaturated carboxylic acid, said $\alpha,\beta$-ethylenically unsaturated carboxylic acid having been reacted with at least 10 % of the epoxy groups of the polyglycidyl polyether.

2. A coating material according to claim 1, wherein the $\alpha,\beta$-ethylenically unsaturated carboxylic acid is acrylic acid, methacrylic acid, crotonic acid, itaconic acid, maleic acid, or fumaric acid or a monoester of one of these acids with an alkanol, said alkanol having 1 to 4 carbon atoms.

3. A coating material according to claim 1, wherein the α,β-ethylenically unsaturated carboxylic acid is methacrylic acid, acrylic acid or a mixture thereof.

4. A coating material according to claim 1, wherein the epoxy resin is represented by the formula:

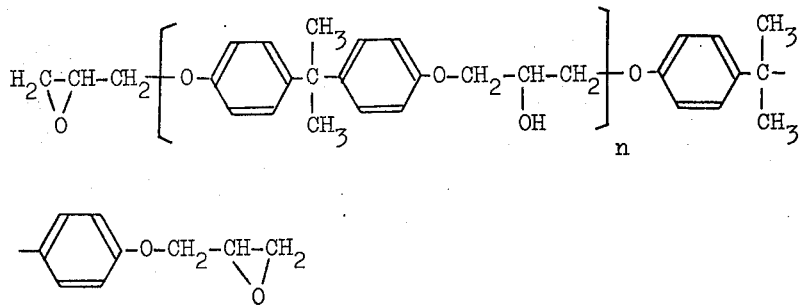

wherein n is an integer of 1 to 10.

5. A coating material according to claim 1, wherein the hydroxy-free, polymerizable, unsaturated monomer is at least one monomer selected from the group consisting of acrylates and methacrylates of alkanols, said alkanols having 1 to 16 carbon atoms, styrene, vinyltoluene, α-methylstyrene, m-ethylstyrene, p-ethylstyrene, vinyl acetate, vinyl propionate, vinyl butyrate, vinyl caproate, diesters of unsaturated dicarboxylic acids having 4 to 5 carbon atoms with alkanols having 1 to 4 carbon atoms, acrylonitrile, methacrylonitrile, ethylene and vinyl esters of neo-acids, said neo-acids having 5 to 27 carbon atoms.

6. A coating material according to claim 1, wherein the hydroxy-free, polymerizable, unsaturated monomer is an acrylate or methacrylate of an alkanol, said alkanol having 1 to 16 carbon atoms.

7. A coating material according to claim 1, wherein the hydroxy-free, polymerizable, unsaturated monomer is styrene or a mixture of styrene and at least one monomer selected from the group consisting of acrylates and methacrylates of alkanols, said alkanols having 1 to 16 carbon atoms.

8. A coating material according to claim 1, wherein the amine for forming the water-soluble salt has a boiling point of 60° to 160°C.

9. A coating material according to claim 1, wherein the amine for forming the water-soluble salt is ammonia, a mono-, di- or tri-alkylamine, a mono- or di-alkanolamine, or a heterocyclic amine.

10. A coating material according to claim 1, wherein the amine for forming the water-soluble salt is ammonia, methylamine, dimethylamine, trimethylamine, ethylamine, diethylamine, triethylamine, ethanolamine, diethanolamine or morpholine.

11. A coating material according to claim 1, wherein the water-soluble amino resin is a reaction product of urea, melamine, benzoguanamine or dicyandiamide with formaldehyde, acetaldehyde, paraldehyde, butyraldehyde, acrolein, crotonaldehyde, benzaldehyde or furfural.

12. A coating material according to claim 1, wherein the water-soluble amino resin is hexamethoxymethylmelamine.

13. A coating material according to claim 1, wherein the water-soluble organic solvent is a solvent which can be dissolved at least 2% by weight in water at 20°C.

14. A coating material according to claim 1, wherein the water-soluble, organic solvent is an alkanol, a glycol derivative, a cyclic ether or a ketone.

15. A coating material according to claim 1, wherein the water-soluble, organic solvent is methanol, ethanol, propanol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, dioxane, acetone or diacetone alcohol.

16. In a coating material comprising water, a water-soluble, organic solvent and a water-soluble, thermosetting resin as substantial film-forming component, said resin being a mixture of (A) 4 to 50 parts by weight of a water-soluble amino resin and (B) a water-soluble salt of 100 parts by weight of a copolymer with 0.5 to 2.0 equivalents of an amine with respect to carboxyl groups in said copolymer, the improvement wherein said copolymer comprises:

1. 50 to 80.5 parts by weight of at least one hydroxy-free, polymerizable, unsaturated monomer having 2 to 30 carbon atoms, 2. a total of 19.5 to 50 parts by weight of an α,β-ethylenically unsaturated carboxylic acid having 3 to 5 carbon atoms and a polyglycidyl polyether of a dihydric phenol, said polyglycidyl polyether having at least two epoxy groups, the proportion of said polyglycidyl polyether being 0.01 to 0.5 equivalent with respect to the carboxyl group contained in said α,β-ethylenically unsaturated carboxylic acid, said α,β-ethylenically unsaturated carboxylic acid having been reacted with at least 10% of the epoxy groups of said polyglycidyl polyether, and 3. up to 30 parts by weight of at least one polymerizable, unsaturated monomer having a hydroxy group and 3 to 8 carbon atoms, the total amount of (1), (2) and (3) being 100 parts by weight.

17. A coating material according to claim 16, wherein in the α,β-ethylenically unsaturated carboxylic acid is acrylic acid, methacrylic acid, crotonic acid, itanonic acid, maleic acid, fumaric acid, or a monoester of one of these acids with an alkanol, said alkanol having 1 to 4 carbon atoms.

18. A coating material according to claim 16, wherein the α,β-ethylenically unsaturated carboxylic acid is methacrylic acid, acrylic acid or a mixture thereof.

19. A coating material according to claim 16, wherein the epoxy resin is represented by the formula:

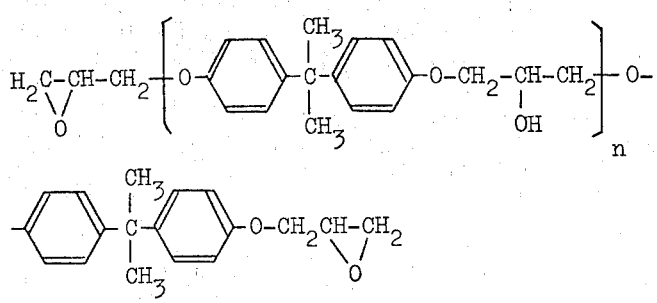

wherein n is an integer of 1 to 10.

20. A coating material according to claim 16, wherein the hydroxy-free, polymerizable, unsaturated monomer is at least one monomer selected from the group consisting of acrylates and methacrylates of alkanols, said alkanols having 1 to 16 carbon atoms, styrene, vinyltoluene, α-methylstyrene, m-ethylstyrene, p-ethylstyrene, vinyl acetate, vinyl propinonate, vinyl butyrate, vinyl caproate, diesters of unsaturated dicarboxylic acids having 4 to 5 carbon atoms with alkanols having 1 to 4 carbon atoms, acrylonitrile, methacrylonitrile, ethylene, and vinyl esters of neo-acids, said neo-acids having 5 to 27 carbon atoms.

21. A coating material according to claim 16, wherein the hydroxy-free, polymerizable, unsaturated monomer is an acrylate or methacrylate of an alkanol, said alkanol having 1 to 16 carbon atoms.

22. A coating material according to claim 16, wherein the hydroxy-free, polymerizable, unsaturated monomer is styrene or a mixture of styrene and at least one monomer selected from the group consisting of acrylates and methacrylates of alkanols, said alkanols having 1 to 16 carbon atoms.

23. A coating material according to claim 16, wherein the polymerizable, unsaturated monomer having a hydroxy group is a hydroxyalkyl methacrylate, a hydroxyalkyl acrylate, allyl alcohol, methallyl alcohol, N-methylol acrylamide or N-methylol methacrylamide.

24. A coating material according to claim 23, wherein the hydroxyalkyl acrylate or methacrylate is 2-hydroxyethyl methacrylate, hydroxypropyl methacrylte, hydroxybutyl methacrylate, hydroxypropyl methacrylate, hydroxybutyl methacrylate, 2-hydroxyethyl acrylate, hydroxypropyl acrylate or hydroxybutyl acrylate.

25. A coating material according to claim 16, wherein the polymerizable, unsaturated monomer having a hydroxyl group is 2-hydroxyethyl methacrylate.

26. A coating material according to claim 16, wherein the amine for forming the water-soluble salt has a boiling point of 60° to 160°C.

27. A coating material according to claim 16, wherein the amine for forming the water-soluble salt is ammonia, methylamine, dimethylamine, trimethylamine, ethylamine, diethylamine, triethylamine, ethanolamine, diethanolamine or morpholine.

28. A coating material according to claim 16, wherein the water-soluble amino resin is a reaction product of urea, melamine, benzoguanamine or dicyandiamide with formaldehyde, acetaldehyde, paraldehyde, butyraldehyde, acrolein, crotonaldehyde, benzaldehyde or furfural.

29. A coating material according to claim 16, wherein the water-soluble amino resin is hexamethoxymethylmelamine.

30. A coating material according to claim 16, wherein the water-soluble, organic solvent is a solvent which can be dissolved at least 2% by weight in water at 20°C.

31. A coating material according to claim 16, wherein the water-soluble, organic solvent is methanol, ethanol, propanol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, dioxane, acetone or diacetone alcohol.

32. In a method for preparing a coating material comprising water, a water-soluble, organic solvent and a water-soluble, thermosetting resin, which resin is a mixture of (A) 4 to 50 parts by weight of an amino resin and (B) a water-soluble salt of 100 parts by weight of a copolymer with 0.5 to 2.0 equivalents of an amine with respect to carboxyl groups is said copolymer, the improvement wherein said method comprises:
1. reacting at a temperature of 100° to 160°C an α,β-ethylenically unsaturated carboxylic acid having 3 to 5 carbon atoms with a polyglycidyl polyether of a dihydric phenol, said polyglycidyl polyether having at least two epoxy groups, in a proportion of 0.01 to 0.5 equivalent of the polyglycidyl polyether with respect to the carboxyl group contained in the acid until at least 10% of the epoxy groups are reacted with said acid,
2. subjecting the resulting reaction product to copolymerization in the presence of a polymerization initiator with at least one hydroxy-free, polymerizable, unsaturated monomer having 2 to 30 carbon atoms in an amount of 50 to 80.5 parts by weight per 19.5 to 50 parts by weight of said reaction product at a temperature of 40° to 160°C,
3. neutralizing the resulting copolymer with said amine to form said water-soluble salt of the copolymer, and
4. then mixing said salt with said water-soluble amino resin.

33. In a method for preparing a coating material comprising water, a water-soluble, organic solvent and a water-soluble, thermosetting resin, which resin is mixture of (A) 4 to 50 parts by weight of an amino resin and (B) a water-soluble salt of 100 parts by weight of a copolymer with 0.5 to 2.0 equivalent of an amine with respect to carboxyl groups in said copolymer, the improvement wherein said method comprises:
1. subjecting a mixture of an α,β-ethylenically unsaturated carboxylic acid and at least one hydroxy-free, polymerizable, unsaturated monomer having 2 to 30 carbon atoms to copolymerization in the presence of a polymerization initiator at a temperature of 40° to 160°C,
2. reacting the resulting copolymer with a polyglycidyl polyether of a dihydric phenol, said polyglycidyl polyether having at least two epoxy groups, in a proportion of 0.01 to 0.5 equivalent of the polyglycidyl polyether with respect to the carboxyl group contained in the acid at a temperature of 100° to 160°C, the total amount of said acid and said polyglycidyl polyether being 19.5 to 50 parts by weight per 50 to 80.5 parts by weight of said hydroxy-free, polymerizable, unsaturated monomer, until at least 10% of the epoxy groups are reacted with the carboxyl groups of said copolymer, 3. neutralizing the resulting copolymer with said amine to form said water-soluble salt of the copolymer, and
4. then mixing said salt with said water-soluble amino resin.

34. In a method for preparing a coating material comprising water, a water-soluble, organic solvent and a water-soluble, thermosetting resin, which resin is a mixture of (A) 4 to 50 parts by weight of an amino resin and (B) a water-soluble salt of 100 parts by weight of a copolymer with 0.5 to 2.0 equivalents of an amine with respect to carboxyl groups in said copolymer, the improvement wherein said method comprises:

1. heating a mixture of an $\alpha,\beta$-ethylenically unsaturated carboxylic acid having 3 to 5 carbon atoms, a polyglycidyl polyether of a dihydric phenol, said polyglycidyl polyether having at least two epoxy groups, the proportion of the two components being 0.01 to 0.5 equivalent of the polyglycidyl polyether with respect to the carboxyl group contained in the acid, the total amount of said two components being 19.5 to 50 parts by weight, and 50 to 80.5 parts by weight of at least one hydroxy-free, polymerizable, unsaturated monomer having 2 to 30 carbon atoms at a temperature of 100° to 160°C to effect simultaneously copolymerization and reaction of the carboxyl groups with the epoxy groups,
2. neutralizing the resulting copolymer with said amine to form said water-soluble salt of the copolymer, and
3. then mixing said salt with said water-soluble amino resin.

35. In a method for preparing a coating material comprising water, a water-soluble, organic solvent and a water-soluble, thermosetting resin, which resin is a mixture of (A) 4 to 50 parts by weight of an amino resin and (B) a water-soluble salt of 100 parts by weight of a copolymer with 0.5 to 2.0 equivalents of an amine with respect to carboxyl groups in said copolymer, the improvement wherein said method comprises:

1. reacting an $\alpha,\beta$-ethylenically unsaturated carboxylic acid having 3 to 5 carbon atoms with a polyglycidyl polyether of a dihydric phenol, said polyglycidyl polyether having at least two epoxy groups, in a proportion of 0.01 to 0.5 equivalent of the polyglycidyl polyether with respect to the carboxyl group contained in the acid at a temperature of 100° to 160°C until at least 10% of the epoxy groups are reacted with said acid,
2. subjecting 19.5 to 50 parts by weight of the resulting reaction product to copolymerization in the presence of a polymerization initiator at a temperature of 40° to 160°C with 50 to 80.5 parts by weight of at least one hydroxy-free, polymerizable, unsaturated monomer having 2 to 30 carbon atoms and up to 30 parts by weight of at least one polymerizable, unsaturated monomer having a hydroxyl group and 3 to 8 carbon atoms, the total amount of the reaction product, the hydroxy-free, polymerizable, unsaturated monomer and the hydroxy-containing polymerizable, unsaturated monomer being 100 parts by weight,
3. neutralizing the resulting copolymer with said amine to form said water-soluble salt of the copolymer, and
4. then mixing said salt with said water-soluble amino resin.

36. In a method for preparing a coating material comprising water, a water-soluble, organic solvent and a water-soluble, thermosetting resin, which resin is a mixture of (A) 4 to 50 parts by weight of an amino resin and (B) a water-soluble salt of 100 parts by weight of a copolymer with 0.5 to 2.0 equivalents of an amine with respect to carboxyl groups in said copolymer, the improvement wherein said method comprises:

1. subjecting a mixture of an $\alpha,\beta$-ethylenically unsaturated carboxylic acid having 3 to 5 carbon atoms, at least one hydroxy-free, polymerizable, unsaturated monomer having to 2 to 30 carbon atoms and at least one polymerizable unsaturated monomer having a hydroxyl group and 3 to 8 carbon atoms to copolymerization in the presence of a polymerization initiator at a temperature of 40° to 160°C,
2. reacting at a temperature of 100° to 160°C the resulting copolymer with a polyglycidyl polyether of a dihydric phenol, said polydlycidyl polyether having at least two epoxy groups, the proportion of the polyglycidyl polyether being 0.01 to 0.5 equivalent with respect to the carboxyl group contained in said acid, the total amount of said acid and said polyglycidyl polyether being 19.5 to 50 parts by weight per 50 to 80.5 parts by weight of said hydroxy-free, polymerizable unsaturated monomer and the amount of the hydroxy-containing polymerizable unsaturated monomer being up to 30 parts by weight, the total amount of the acid, the polyglycidyl polyether, the hydroxy-free monomer and the hydroxy-containing monomer being 100 parts by weight, until at least 10% of the epoxy groups are reacted with the carboxyl groups of said copolymer,
3. neutralizing the resulting copolymer with said amine to form said water-soluble salt of the copolymer, and
4. then mixing said salt with said water-soluble amino resin.

37. In a method for preparing a coating material comprising water, a water-soluble, organic solvent and a water-soluble, thermosetting resin, which resin is a mixture of (A) 4 to 50 parts by weight of an amino resin and (B) a water-soluble salt of 100 parts by weight of a copolymer with 0.5 to 2.0 equivalents of an amine with respect to carboxyl groups in said copolymer, the improvement wherein said method comprises:

1. heating at a temperature of 100° to 160°C a mixture of an $\alpha,\beta$-ethylenically unsaturated carboxylic acid having 3 to 5 carbon atoms; a polyglycidyl polyether of a dihydric phenol; said polyglycidyl polyether having at least two epoxy groups, the proportion of said acid and said polyglycidyl polyether being 0.1 to 0.5 equivalent of the polyglycidyl polyether with respect to the carboxyl group contained in the acid, the total amount of said two components being 19.5 to 50 parts by weight; 50 to 80.5 parts by weight of at least one hydroxy-free, polymerizable, unsaturated monomer having 2 to 30 carbon atoms; and up to 30 parts by weight of at least one polymerizable, unsaturated monomer having a hydroxyl group and 3 to 8 carbon atoms, the total amount of the acid, the polyglycidyl polyether, the hydroxy-free monomer and the hydroxy-containing monomer being 100 parts by weight, to effect simultaneously copolymerization and reaction of the carboxyl groups with the epoxy groups, 2. neutralizing the resulting copolymer with said amine to form said water-soluble salt of the copolymer, and
3. then mixing said salt with said water-soluble amino resin.

38. An article coated with the coating material of claim 1.

39. An article coated with the coating material of claim 16.

* * * * *